United States Patent [19]

Guggolz

[11] 3,882,489

[45] May 6, 1975

[54] APPARATUS FOR PRODUCING A DIGITAL ELECTRICAL REPRESENTATION OF A PEAK VALUE OF AN ANALOG SIGNAL

[75] Inventor: Bernd R. Guggolz, Collings Lake, N.J.

[73] Assignee: John Chatillon & Sons Inc., Kew Gardens, N.Y.

[22] Filed: May 15, 1974

[21] Appl. No.: 470,029

[52] U.S. Cl. ................. 340/347; 328/150; 307/235

[51] Int. Cl. ........................................... H03k 13/17

[58] Field of Search...... 340/347 AD; 328/150, 151; 307/235

[56] References Cited

UNITED STATES PATENTS

| | | | |
|---|---|---|---|
| 3,292,150 | 12/1966 | Wood | 340/149 |
| 3,336,590 | 8/1967 | Kaneko | 340/347 |
| 3,610,894 | 10/1971 | Drury et al. | 235/92 NT |
| 3,624,500 | 11/1971 | Patzelt | 324/99 D |
| 3,678,513 | 7/1972 | Ward | 340/414 |

*Primary Examiner*—Malcolm A. Morrison
*Assistant Examiner*—Vincent Sunderdick
*Attorney, Agent, or Firm*—Howson and Howson

[57] ABSTRACT

A digital display of the peak value of an input analog signal is obtained by using a capacitor-storage feedback circuit to derive and store a signal substantially equal to the peak value of the input analog signal, and then comparing this stored peak value with the instantaneous value of the analog signal to produce a HOLD signal whenever the occurrence of a peak is indicated by the analog signal falling below the stored signal by a predetermined amount. A digital voltmeter is supplied directly with the analog signal so as to produce a continuously changing digital output indication of the value of the analog signal except when the HOLD signal indicating the occurrence of a peak is applied to the digital voltmeter to prevent the digital indication from changing further, thereby holding the peak digital indication for a very long period of time. If the analog signal later rises to a higher peak, the digital voltmeter will follow this and hold at a digital number representing the subsequent peak value. By disabling the HOLD control circuitry, the digital voltmeter can be permitted to follow the analog signal at all times when it is not desired to display merely the peak value of the signal. The storage circuit is preferably of the type in which a capacitor is intermittently charged by pulses of current from a constant-current source by means of an electronic switch which is turned on each time a comparator indicates that the analog signal exceeds the feedback signal from the charged capacitor. The peak reading on the digital voltmeter remains exactly constant even though the voltage across the capacitor may decay substantially, so long as it does not decay so much as to fall below the analog signal level by a predetermined amount. Thus, particularly for applications in which the analog signal peak is followed by a relatively large and rapid decrease in analog signal, an extremely long hold time for the digital output reading can be obtained without requiring an expensive low-leakage capacitor or associated circuits. In the preferred embodiments, the apparatus can be utilized to enable digital indication of the peak of force exerted on a test object by a test stand, and of the corresponding value of displacement (e.g. compression or elongation) of a test specimen in the test stand.

7 Claims, 8 Drawing Figures

APPARATUS FOR PRODUCING A DIGITAL ELECTRICAL REPRESENTATION OF A PEAK VALUE OF AN ANALOG SIGNAL

BACKGROUND OF THE INVENTION

This invention relates to apparatus for producing and maintaining a digital electrical representation of substantially the peak value of an analog signal applied thereto, and particularly to such apparatus which is capable of producing accurate representations of peak value and of holding them for very long periods of time without requiring expensive signal-storage devices and associated circuitry. In a preferred aspect, the invention relates to such apparatus for producing a digital numerical display of the peak value of force exerted by a test stand for testing the response of a test object to variations in applied force.

There are a very large variety of applications in which it is desirable to produce a digital electrical representation of the peak value of an input analog signal. For example, one may be interested in the peak value of applied force and/or resultant elongation or compression of a test object such as a spring, a yarn, or a structural element. In such case an analog signal having a value proportional to the quantity of interest is readily derived by conventional sensing means, and the peak value of the signal can be determined by known peak-detector circuits and applied to an analog-to-digital converter to produce a corresponding digital representation of the peak value. Such a digital representation can be used to operate a visual display of the numerical value of the peak value, or can conveniently by fed into logic or computer-type circuitry for performing other functions on the basis of the digital peak-value information, such as control of the test conditions applied to the test object.

In such applications, it is commonly important to provide a reasonably accurate representation of the peak value, to hold the peak reading for a long period of time, and to do so as inexpensively as possible.

One well-known form of apparatus for providing electrical representation of the peak value of analog signal supplies the analog signal through a diode rectifier to a capacitor so as to charge the capacitor only when the analog signal is increasing. The voltage across the capacitor can then be applied to an analog-to-digital (A/D) converter through long discharge time-constant circuits so that the digital converter will represent the peak value in digital form.

There a number of inherent drawbacks in such circuits. First, if the numerical display is to stay substantially constant for long periods of time after the occurance of a peak, for example within 1% of original value after many minutes, then the capacitor itself and all elements connected across it must have extremely high resistance and very low charge-leakage properties, else the charge will tend to leak off and the reading decline. While in some cases it is possible to achieve very low leakage utilizing special components and circuitry, such special components and circuitry add very substantially to the cost of the apparatus. On the other hand, if less expensive components are used with resultant greater leakage, the digital representation will gradually decrease rather than stay constant.

Secondly to achieve accuracy with such a system, all of the circuitry between the analog input and the input terminal of the A/D converter, including the charging circuit and any isolating or amplifying circuits, must all be selected and adjusted so that the signal reaching the A/D converter is the same as the original analog input signal, and this relation must be maintained despite changes in the circuit components due to aging for example. In addition, since in such a system the voltage across the capacitor is utilized as the source of the signal supplied to the A/D converter, and since the input analog signal is applied to the capacitor by way of a diode rectifier, the accuracy of the signal supplied to the A/D converter will be affected by the voltage drop in the rectifier, and by changes in this drop not only due to aging of the like but also due to variations in rectifier voltage drop with current through it. Accordingly, the combination of accuracy, long hold-time and cost associated with such types of circuitry is less favorable that is desired for many purposes.

It is also possible to convert the analog signal directly to digital form and then, by means of appropriate logic circuits, permit only increasing digital-number representations to be passed on or displayed optically; since decreases in the analog signal would then not be effective to reduce the digital representation, the latter representation would show the numerical value of the peak of the analog signal. However, such apparatus requires specialized digital logic circuits which may be of considerable expense, and are not normally present in an ordinary digital voltmeter for example.

It is therefore an object of the invention to provide new and useful apparatus for producing and maintaining a digital electrical representation of substantially the peak value of an analog signal.

Another object is to provide such apparatus which can readily be switched to provide digital electrical representation of the instantaneous values of the analog signal, whether increasing or decreasing.

Another object is to provide such apparatus which is capable of holding the representation of peak value for very long intervals of time, without requiring expensive low-leakage components and circuitry.

Another object is to provide such apparatus which provides accurate representation of peak value.

A still further object is to provide such apparatus which will provide accurate electrical representation in digital form of a first peak value in an analog signal and of subsequent equal or larger values thereof.

SUMMARY OF THE INVENTION

These and other objects and features of invention are realized by the provision of apparatus comprising an analog-to-digital converter means having a signal input to which the analog signal is supplied and having a control terminal which, when supplied with a first value of control signal, permits the digital number representation in the converter to follow both increases and decreases in the analog signal value, and which when supplied with a second value of control signal prevents the electrical digital representation from following decreases in analog signal value; means are also provided for detecting when the analog signal has reached a peak and for supplying said second value of control signal to the A/D converter when the occurrence of such a peak is detected. The A/D converter will then hold the value which is contained when the peak occurred. Preferably the means for detecting occurrence of a peak comprises electrical peak-detector and signal storage means supplied with the analog signal for producing and storing a signal substantially equal to a peak value of the analog signal, and comparator means for comparing the stored signal with the analog signal to produce a control signal of said second value when the value of the stored signal exceeds the value of the analog signal by at least a predetermined amount. In this system, once the peak is detected and the analog-to-digital converter has been switched to its HOLD condition, the digital representation will stay exactly constant for a long period of time, and in fact for an indefinitely long period of time so long as the stored signal level at least remains above the input analog signal level. In typical applications in which the analog signal falls relatively rapidly after its peak, the storage circuit can tolerate an appreciable amount of current leakage, and hence need not use special expensive components or circuitry. Accuracy is achieved by virtue of the fact that the input analog signal is applied directly to the A/D converter rather than through additional circuitry. The peak value representation can be made to persist until a larger peak occurs, or at least a peak about as large as the first one, and to provide a representation of such subsequent peak, making the apparatus suitable for repetitive measurements.

Preferably the electrical peak-detector and storage means comprises capacitive means and means for charging the capacitive means only so long as the analog signal is increasing in value. In the preferred form, the electrical peak-detector and storage means also comprises differential amplifier means which is supplied at one input terminal with the analog signal and supplied at another input terminal thereof with a signal level varying in accordance with the voltage across the capacitive means, together with means for charging the capacitive means only when the analog signal level at said one input terminal exceeds the level of the fedback storage signal at the other input terminal to the differential amplifier. The feedback loop of this circuit preferably has sufficient gain that the fedback storage signal level at said other input terminal is alternately greater and less than the analog signal level when the analog signal level is increasing, thereby causing the capacitive means to be charged by short time-spaced current pulses so long as the analog signal is increasing in value. Charging of the capacitive means is preferably accomplished by a source of charging current and electronic switch means connected thereto to provide a substantially constant-current source for charging the capacitive means during intervals when the electronic switch means is rendered conductive, together with means which respond to the output of the differential amplifier means to render the switch means conductive each time the level of the analog signal exceeds the level of the signal at the feedback terminal. The comparator means for controlling the A/D converter preferably comprises means for changing the control signal from said one to said other level only when the analog signal is less than said stored signal level by a predetermined substantial amount, thereby preventing actuation of the comparator means by the normal step-like charging increments of voltage produced during build-up of the analog signal by the storage circuitry, and assuring that the comparator means will not be actuated by noise signals as opposed to an actual peak in analog signal value.

BRIEF DESCRIPTION OF FIGURES

These and other objects and features of the invention will be more readily understood from a consideration of the following detailed description taken in connection with the accompanying drawings, in which.

DESCRIPTION OF SPECIFIC EMBODIMENTS

Figure 1:
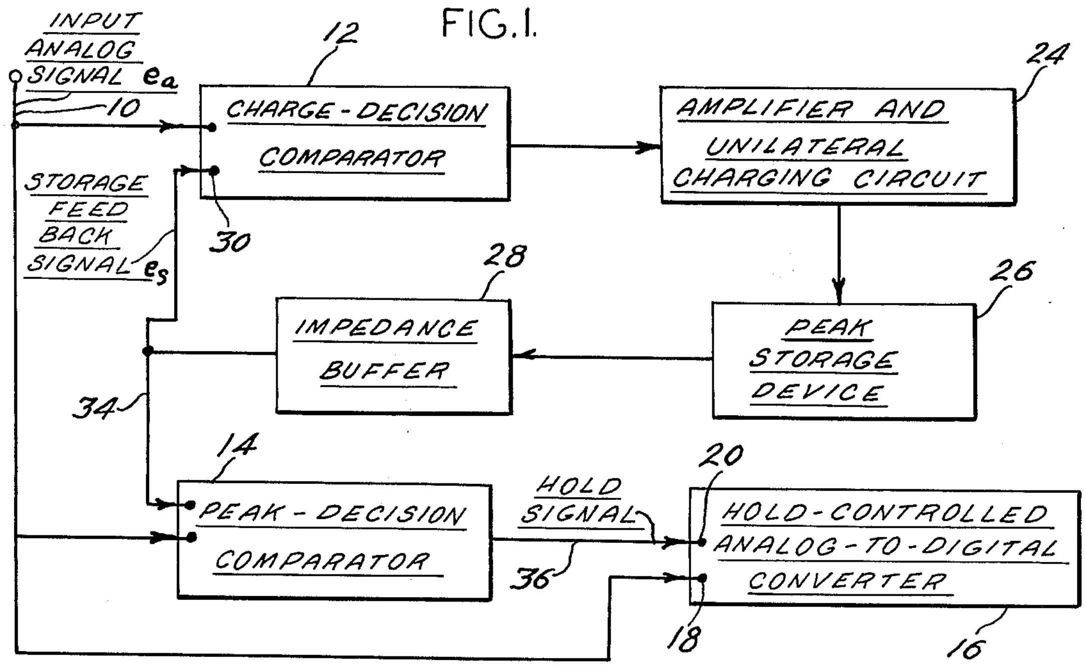
FIG. 1 is a block diagram illustrating a general arrangement of apparatus in accordance with the invention.

Referring now to FIG. 1 illustrating in block form one preferred form of the invention, it is assumed that an analog signal input of interest is supplied on input line 10 and is then delivered to a charge-decision comparator 12, a peak-decision comparator 14 and a hold-controlled analog-to-digital converter 16. A/D converter 16 responds to the analog signal supplied to its signal input terminal 18 to produce a digital electrical representation of a number corresponding to the value of the analog signal. Converter 16 may, for example, be an ordinary digital voltmeter in which the digital electrical representation is utilized to produce visual indications of the digital number for readout purposes; on the other hand, it may instead supply an electrical output to other logic or computer circuits for computation or control purposes, for example. In most cases the number representation will be stored at least temporarily in the converter in storage registers, typically in binary digital form.

A/D converter 16 also has a control terminal 20 which when supplied with a first value of control signal permits the A/D converter to follow both increases and decreases in the value of the analog signal and to produce substantially simultaneous digital electrical representation thereof; when a control signal of a second value is applied to control terminal 20, A/D converter is no longer able to follow decreasing values of the analog signal, and in the preferred form in fact is not able to follow either increases or decreases of the analog signal but instead holds constant the value of the number which it represents electrically. While the A/D converter may take many forms, in a particularly convenient form it is a digital voltmeter of the type which, in one mode of operation and with one level of control signal, produces visual indications of a number corresponding to the value of the analog signal as the analog signal increases or decreases or stays constant, but presents a constant unchanging number indication when the control signal is switched to its second control level. Such devices are well known in the art and commercially available, and may for example comprise the Weston Instruments, Inc. type 1230–274873 digital voltmeter.

The remainder of the system then functions by responding to the analog signal to cause the HOLD control signal at terminal 20 to assume its first value for which the A/D converter follows both increases and decreases so long as the analog signal is increasing toward a peak; and to switch the HOLD control signal to its second level, for which the converter does not follow decreases in analog signal and preferably remains substantially constant despite increases or decreases in analog signal, when the analog signal has reached a peak and has begun to decline in value. More particularly, the analog signal input on line 10 is applied to a charge-decision comparator 12, the output of which is applied to an amplifier and unilateral charging circuit 24 to produce controlled charging of a peak storage device 26; the signal developed across device 26 is applied through an impedance buffer 28 to feedback input terminal 30 of the charge- decision comparator. Charge-decision comparator 12 in effect compars the analog signal level applied to it from line 10 with the storage feedback signal applied to its terminal 30 and, if the analog signal level exceeds the storage feedback signal level, actuates amplifier and unilateral charging circuit 24 to apply a pulse of charging current to the peak storage device 26. This results in an increase in the voltage level across the peak storage device which, when applied back to terminal 30, causes the level at terminal 30 momentarily to exceed the analog signal level, and comparator 12 responds to this situation by deactuating the amplifier and unilateral charging circuit 24 to discontinue charging of peak storage 26. So long as the analog signal is increasing in value, this process will be repeated, whereby the analog signal first rises above the feedback signal to cause a pulse of current into the peak storage device 26, thereby causing the storage feedback signal to increase momentarily above the analog signal, cutting off further charging of the storage device until the analog signal again rises above the feedback signal level. The interval between charging pulses depends upon the rate of a rise of the input analog signal.

Figure 2A:
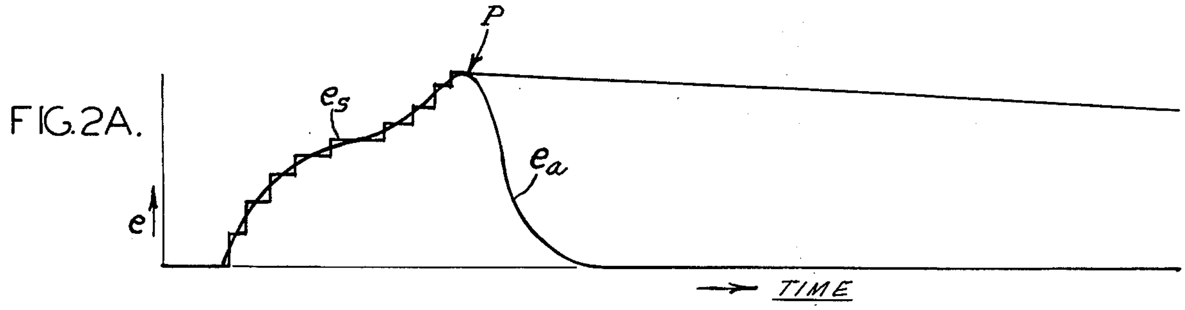
FIGS. 2A through 2C are graphical representations to which reference will be made in explaining the operation of the apparatus in response to a single-peaked analog signal.
Figure 2B:
Figure 2C:

FIGS. 2A, 2B and 2C illustrate the general nature of this charging action in response to an increasing analog signal input. In FIG. 2A, ordinates of curve $e_a$ represent the value of the analog input signal, ordinates of the curve $e_s$ represent the values of the fedback storage signal, and abscissae of both curves represents time, typically to a scale of minutes or tens of minutes depending on the particular application. The analog signal is assumed to be of a form which increases from zero value to a peak at point P and then falls relatively rapidly back to its zero value. The fedback storage voltage $e_s$, as shown, consists of steep-fronted steps of voltage each of which rises rapidly until it exceeds the analog signal slightly, then remains constant until the analog signal exceeds the feedback voltage slightly, at which time the next step occurs. FIG. 2B is a plot to the same time scale of the charging current into the peak storage device 26. As shown, the short pulses of current occur contemporaneously with the rises in the steps of the storage signal $e_s$.

It will therefore be seen that comparator 12 serves the function of comparing the analog signal input with the fedback storage signal to reach a decision on whether a pulse of charging current should be applied to the peak storage device 26, based on whether or not the analog signal is greater or less than the fedback storage signal. Accordingly, once the analog input signal $e_a$ reaches its peak, the amplifier and unilateral charging circuit 24 will not again be turned on, and the peak storage device 26 will not be further charged; because the charging circuit 24 is unilateral in nature, and the impedance buffer 28 and the input terminal of comparator 12 represent quite high resistances to discharge of device 26, the voltage on the peak storage device 26 and the level of the feedback storage signal at terminal 30 will tend to remain nearly constant thereafter, although it will gradually decline due to current leakage from the peak storage device 26, as represented in FIG. 2A. Accordingly, the signal at input terminal 30 of comparator 12 is a stored signal which increases only so long as the analog signal continues to increase, and decays only gradually from the peak value of the analog signal after this peak has been passed.

The peak-decision comparator 14 is supplied both with the analog input signal from input line 10 and with the storage signal supplied thereto over line 34, which is the same as the storage signal at input terminal 30 of comparator 12. Peak-decision comparator 14 responds to its input signals $e_a$ and $e_s$ to determine when $e_a$ is less than $e_s$ by more than a predetermined amount. When it makes this determination, it generates a HOLD signal on its output line 36 corresponding to the previously-mentioned second value of control signal at terminal 20, and thereby causes the digital number representation in A/D converter 16 to remain constant so long as comparator 14 continues to make this decision. At other times, e.g. when $e_a$ is greater than $e_s$, the control signal on line 36 from comparator 14 has the above-mentioned first control level which permits A/D converter 16 to follow the analog signal for both directions of change. Where the above-described step-like charging of the peak storage device 26 is utilized, the amount by which $e_a$ must fall below $e_s$ before comparator 14 reaches a decision that a peak in $e_a$ has occurred is preferably at least somewhat greater than the greatest amount by which the fedback storage voltage $e_s$ exceeds the analog signal $e_a$ during the steplike charging, so that comparator 14 will not reach a false decision in response to these charging steps.

FIG. 2C therefore represents the output of peak-decision comparator 14 supplied to the control terminal 20 of A/D converter 16; ordinates represent control signal level and abscissae represent time to the same scale as in FIGS. 2A and 2B. It will be seen that the control voltage level $e_c$ has a first value, in this case a relatively lower value, up until the time of the occurrence of the peak in the input analog signal $e_a$, at which time the control voltage $e_c$ switches substantially instantaneously to a second higher level and remains at this level so long as $e_a$ remains appreciably below $e_s$.

Accordingly, the electrical digital number representation produced by A/D converter 16 remains exactly constant so long as peak-decision comparator 14 determines that the analog input signal is below the level of the fedback storage signal $e_s$ by at least a predetermined amount. It is emphasized that the digital representation in the A/D converter may remain constant for an extremely long time despite the fact that the storage signal $e_s$ may be declining appreciably due to charge leakage. This is because the storage signal itself is not used to generate the digital-number representation, but instead the digital-number representation is produced directly from the analog signal and the storage signal $e_s$ is merely used to assist in reaching a decision as to when a peak has been reached and passed. Accordingly, very long-term constant digital representation of a peak value can be produced by converter 16, despite the fact that relatively inexpensive components of circuitry in the peak storage device and circuits connected thereto may be utilized with resultant appreciable charge leakage. The accuracy is also high, because the input signal is applied directly to the A/D converter rather than through various other circuits which might require extremely expensive components in order to minimize unavoidable drifts and changes.

It will be understood that the polarity of the peak to be sensed and represented is not fundamental, since with appropriate circuitry either positively-extending or negatively-extending peaks may be sensed and represented, and a peak is therefore considered to include "maxima" and "minima", and positive and negative signals.

Figure 3A:
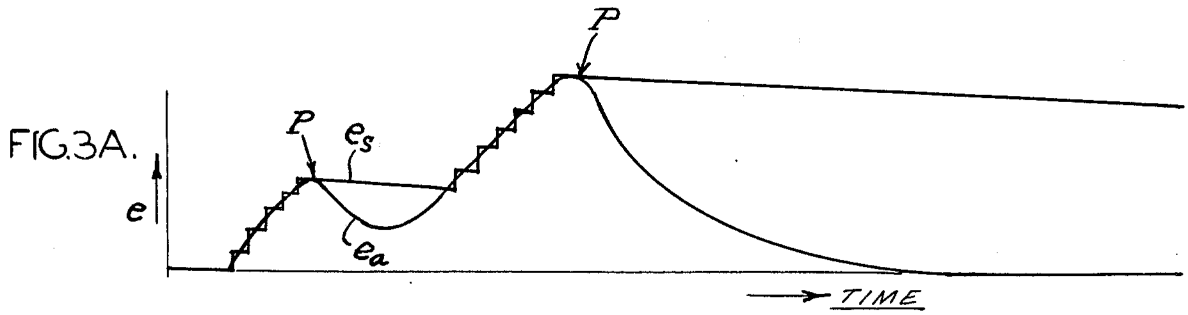
FIGS. 3A through 3C are graphical representations to which reference will be made in explaining the operation of the invention in response to an analog signal having successively larger peak values.
Figure 3B:
Figure 3C:
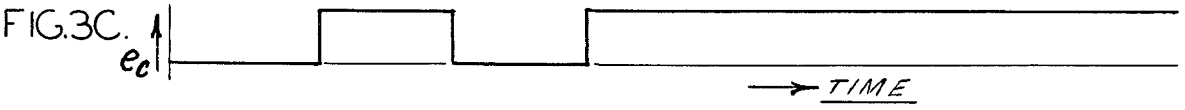

FIGS. 3A through 3C are graphs depicting the same variables as are shown in FIGS. 2A to 2C respectively, but for the case in which the input analog signal $e_a$ has a first peak followed by a second larger peak. In this case the staircase-charging of the peak storage device 26 occurs during the rise of the analog voltage to its first peak in the same manner as in FIG. 2A, as a result of the narrow current pulses shown in FIG. 3B, while the control signal $e_c$ from the peak decision comparator 14 remains at its low first level as shown in FIG. 3C. After the first peak occurs, the fedback storage signal $e_s$ remains nearly constant while the input analog signal $e_a$ falls, so that the peak-decision comparator 14 changes to its alternate state for which its output is at its second, higher level, and the A/D converter produces a constant output corresponding to the peak value of the input analog signal. The A/D converter remains in this condition until the analog input voltage has risen above the stored signal level, at which time the staircase-charging operation is repeated as the analog signal rises to its second peak. When the staircase-charging resumes during the second rise of the analog voltage, the peak-decision comparator 14 senses that the input analog signal has become greater than the stored signal $e_s$ and reverts to its first lower level of control voltage output, releasing the A/D converter to follow the analog signal level. When the second peak of the analog signal is reached, the peak-decision comparator 14 again determines that the analog signal $e_a$ has fallen below the stored signal $e_s$ by a predetermined amount, the output of the peak-decision comparator 14 again rises to its second control value, and the A/D converter is again put in a HOLD position to maintain constant the reading corresponding to the second peak.

It is also noted that is the second peak has been of the same amplitude as the first peak, rather than larger, the A/D converter would still be released at least briefly by the peak-decision comparator, particularly in view of the slight decay of the stored voltage $e_s$ which would cause the second peak of analog signal to exceed the stored voltage level. Thus if the input analog signal comprises a cyclically-varying voltage of substantially constant amplitude, the stored voltage $e_s$ will decay slightly between peaks, but be raised to full value by brief charging at each successive peak, so that the inter-peak reading of the A/D converter will be maintained indefinitely so long as the repetitive analog signal continues. For example, if a test specimen is to be subjected to repetitive testing by the application of the same cyclical force-variation, recurring for example once a minute, the digital number represented by the A/D converter will remain fixed at the value of the immediately preceding peak of the force-representing analog signal and then execute a very slight dip and recovery during a very brief instant immediately following each peak, so that a visual readout of the A/D converter output signal will provide a suitable indication of the peak value of the analog signal. A similar action can be obtained even if the peaks in some instances decreases in value with time, provided they do not decrease more rapidly than the decay of the stored voltage $e_s$, the decay rate of which can be adjusted by appropriate selection of the degree of charge leakage produced by the circuit associated therewith.

Figure 4:
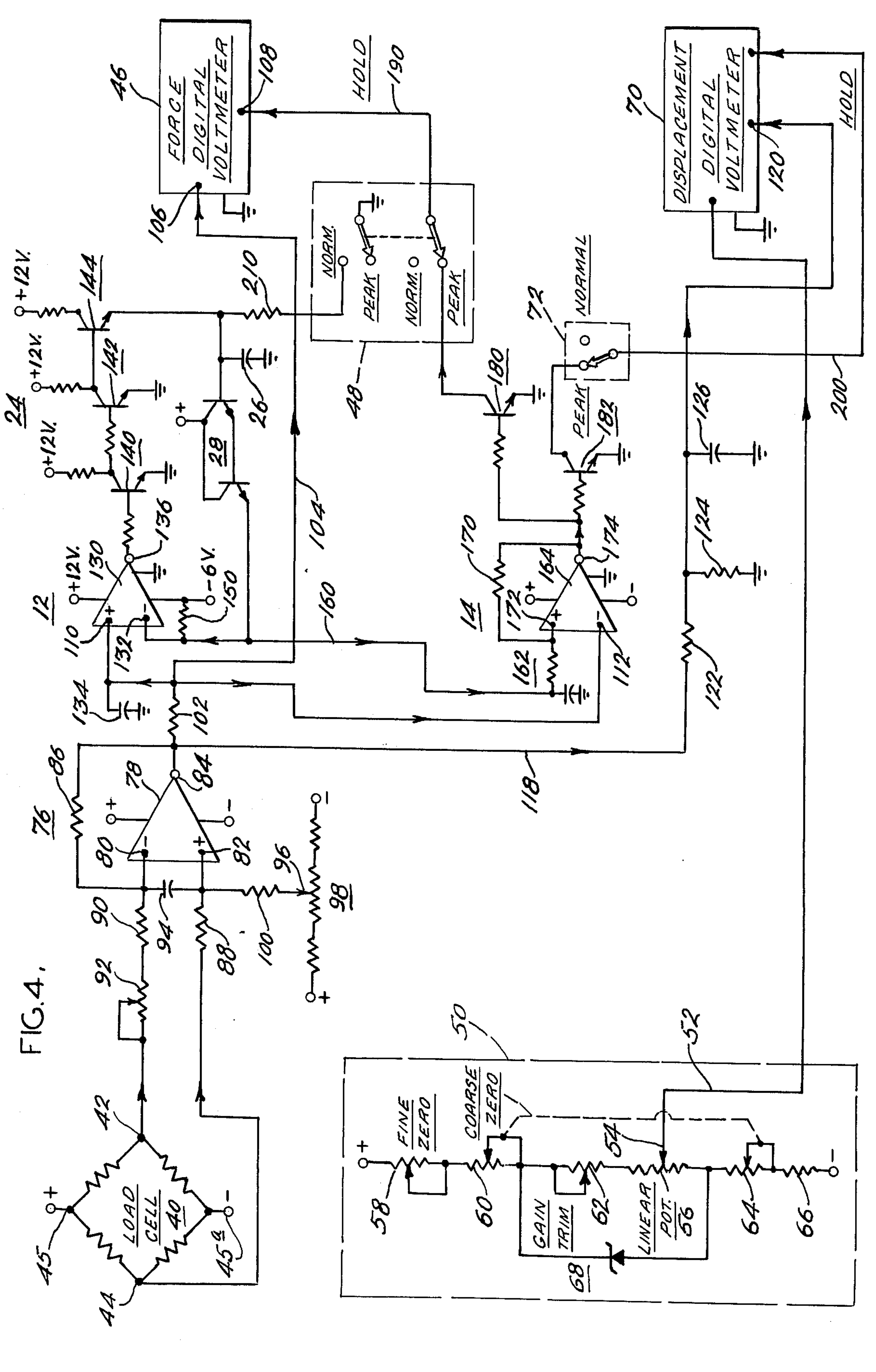
FIG. 4 is an electrical schematic diagram illustrating in more detail a preferred form of the invention as utilized to provide indications of the force and distance parameters in a test stand for testing objects by applying varying forces thereto and observing the value of force and the value of the resultant compression or expansion of the object.

Turning now to FIG. 4, there are shown details of a specific application of the invention in a preferred form to a system suitable for use in connection with a test stand arranged to apply a test force to a subject under test, and to produce visible readouts in digital form of the peak force applied and of the contemporaneous value of the extension or compression of the test specimen.

In FIG. 4 there is shown a conventional load cell 40 comprising the usual bridge-circuit arrangement of strain-sensitive resistive elements, with the direct supply voltage applied across one diagonal of the bridge and with output taken across the opposite pair of diagonal junction points 42 and 44. In a typical example, the supply voltage to the load cell may be +15 volts at the upper terminal 45 and −15 volts at the lower terminal 45A. The function of the circuit of FIG. 4 is to present a visual digital indication on the force digital voltmeter 46 of a number corresponding to the force-representing analog signal developed between terminals 42 and 44 of the load cell; when the mode selector double-pull double-throw switch 48 is in the "peak" position shown, the force digital voltmeter presents a visible digital numerical display of the peak value of the analog signal, while when mode switch 48 is in its alternate "normal" position the force digital voltmeter displays a digital number corresponding to the instantaneous varying value of the analog signal.

Also shown is a displacement-sensing circuit 50 of conventional form for producing on output line 52 thereof a displacement-representing signal indicative of the extension or compression of the test object produced in response to the applied test force. Thus the movable tap arm 54 of the linear potentiometer 56 may be mechanically connected to a movable platform of the test stand, and a test object connected between the fixed platform and the movable platform. In this example, the linear potentiometer 56 is connected in series with a "fine-zero" variable resistor 58, with the upper section 60 of a "coarse-zero" variable resistor 60, with a gain trim resistor 62 and with the lower section 64 of the "coarse-zero" resistor and a fixed resistor 66. A zenar diode 68 is connected across the series combination of the linear potentiometer 56 and the gain trim resistor 62 so as to provide across the linear potentiometer a regulated DC voltage which can be trimmed by adjustment of gain trim resistor 62. The absolute DC level of the voltage applied across the linear potentiometer 56 can be adjusted by means of the two-sectioned "coarse-zero" variable resistances 60 and 64, adjusted in conjunction with "fine-zero" adjustment 58. Such arrangements being well known in the art, it is unnecessary to describe their construction and operation thereof.

The circuit of FIG. 4 then functions to display on displacement digital voltmeter 70 a visible digital numerical display of a number representing the instantaneous relative displacement of the platform of the test stand, and hence the extension or compression of the object under test, when the mode switch 72 is in its NORMAL position; when mode switch 72 is in its PEAK position as shown, digital voltmeter 70 displays the value of displacement occurring when a peak in the applied force is detected.

Considering now in detail the circuit used in this example to process the force-representing signal, the latter signal for the load cell is passed through an operational amplifier stage 76 of conventional form, comprising an amplifying device 78 having an inverting input terminal 80, a non-inverting terminal 82 and an output terminal 84, supplied with appropriate positive and negative supply voltages. The usual feedback resistor 86 is connected between the output terminal and the inverting input terminal, and the two output lines from the load cell are applied to the input terminals 80 and 82, in one case through the fixed series resistance 88 and in the other case through the fixed resistance 90 and the variable resistance 92. As is usual in such devices, the gain of the stage is determined by the ratio of the feedback resistance to the input resistance, and the variable resistance 92 therefore provides a convenient trimmer adjustment for the gain of the stage. A noise suppressing capacitor 94 may be utilized between the input terminals 80 and 82 as shown. Bias for the input of the stage is provided from a variable tap 96 on a voltage divider 98 connected between the positive and negative supply voltage sources, by way of a series resistor 100. Adjustment of tap 96 serves as a null adjustment, permitting zeroing out of the effects of dead weight of grasping tools, hardware, and the like.

The output of the stage 76 is applied to four different points: first, it is supplied directly through series resistor 102 over line 104 to the signal input terminal 106 of the force digital voltmeter, this signal then constituting the input analog voltage to the voltmeter which the voltmeter follows for both directions of change so long as the signal supplied to the HOLD control terminal 108 of the voltmeter indicates that the HOLD operation is not to occur; the output signal of stage 76 is also supplied through resistor 102 to the non-inverting input terminal 110 of the charge-decision comparator 12 and to the inverting input terminal 112 of the peak-decision comparator 14; in addition, the output of amplifier 76 is supplied directly over line 118 to the signal-ground terminal 120 of the displacement digital voltmeter 70, by way of the divider and filter circuit provided by resistors 122 and 124 and capacitor 126. The latter divider and filter circuit provide a variable reference for the displacement voltmeter to compensate for the apparent displacement produced by deflection of the load cell in response to the applied test force, it being understood that the load cell is ordinarily in series mechanically with the test object.

The charge-decision comparator 12 comprises a differential amplifier stage 130 having a non-inverting input terminal 110 and an inverting input terminal 132, and supplied with the usual positive, negative and ground supply voltages. A capacitor 134 is preferably connected between the non-inverting input terminal and ground to reduce noise interference effects. Comparator 12 functions to produce a HIGH at its output terminal 136 when the level of the force-representing signal at its non-inverting input terminal 110 exceeds the signal level at its inverting input terminal 132 by more than a predetermined small amount, and to produce a LOW when the level at the inverting terminal becomes larger than that at the non-inverting terminal by a predetermined small amount. The differential amplifier 130 exhibits an appreciable but small "gray zone" about the condition for which the signal levels at its two input terminals are exactly equal, producing a type of hysteresis effect whereby the level at either of the input terminals 110 and 132 must rise above the level at the other terminal by an appreciable small amount such as 1 millivolt before the output of the comparator will switch to its opposite state.

The output of the charge-decision comparator is supplied to the amplifier and unilateral charging ciruit 24, in this example comprising three grounded-emitter transistor stages 140, 142, and 144, each having a collector resistor connected to the positive supply voltage, which may be 12 volts, and the first two stages having series base input resistors as well. The transistor in each of these stages is of the NPN type so as to be turned on by positive voltages applied to the base thereof.

Accordingly, when the output of charge-decision comparator 12 is high, transistor stage 140 will be turned on, transistor stage 142 will be turned off, and transistor stage 144 will be turned on strongly in full saturation so as to pass a high current from the positive supply voltage into its emitter circuit. When the output of the charge-decision comparator goes low, the opposite conditions occur and current in transistor stage 144 is cut off.

The peak storage device 26 in this example constitutes a capacitor connected in series between the emitter of transistor stage 144 and ground, so as to be charged up when transistor stage 144 is placed in saturation. Thus, each time the charge-decision comparator 12 produces a high output, a large substantially uniform current will flow into capacitor 26 to charge it positively.

The voltage developed across the peak storage capacitor 26 is applied through the transistor Darlington pair 28 acting as an impedance buffer, to the inverting input terminal 132 of the charge-decision comparator 12; high-resistance biasing resistor 150 connects input terminal 132 to a negative bias point.

In the operation of the portion of this circuit just described, assume that capacitor 26 is initially substantially completely discharged. When the force-representing analog signal applied to non-inverting input terminal 110 increases, the output of the charge-decision comparator 12 goes high, and capacitor 26 is rapidly charged from the positive supply voltage through the charging transistor stage 144, until the stored feedback voltage developed across capacitor 26 and fedback to input terminal 132 rises to about 1 millivolt above the force-representing signal at the input terminal 110. When this occurs, the charge-decision comparator output goes low and charging of the capacitor is immediately discontinued.

The force-representing signal then continues to increase, and when it has increased by about 1 millivolt beyond the stored feedback voltage, the charge-decision comparator output again goes high, and another pulse of charging current is applied to capacitor 26. Thus as described more generally with respect to the FIGS. 1–3, the stored feedback voltage at inverting input terminal 132 will increase in staircase-fashion along with the analog force-representing signal until the latter signal reaches a peak, after which it will no longer exceed the stored feedback voltage, the output of the charge-decision comparator will remain low, and no further charging of the capacitor 26 will occur. Furthermore, capacitor 26 will discharge only slowly, because of the presence of the impedance buffer circuit and the high impedanced connected to the output of the buffer; in this connection, it is noted that bias resistor 150 is preferably of a high value, for example at least 100,000 ohms.

The stored feedback voltage at terminal 132 is also supplied over line 160 and through the RC noise-suppressing filter 162 to the non-inverting input terminal of the amplifying device 164 in the peak-decision comparator 14. Amplifyfing device 164 may be like the corresponding amplifying device 130 in the charge-decision comparator, except that, in this example, it exhibits a substantially larger amount of hysteresis effect due to the addition of the resistor 170 between the non-inverting input terminal 172 and the output terminal 174. By way of example, this hysteresis may be about 5 millivolts in magnitude. This means that interfering noise signal would have to be greater than millivolts in order to operate the comparator, and it also means that the typical 1 or 2 millivolt steps in the staircase voltage supplied over line 160 are not in themselves sufficient to operate the peak-decision comparator 14.

It is noted that the stored feedback signal $e_s$ and the analog force-representing signal $e_a$ are applied to the inverting and non-inverting input terminals of the peak-decision comparator in a manner opposite to their application to the charge-decision comparator, so that the output of the peak-decision comparator at its output terminal 174 goes HIGH, rather than LOW, when the force-representing analog signal supplied to its input terminal 112 is smaller than the storage feedback signal supplied to its non-inverting terminal 172 by an appreciable predetermined increment, for example 5 millivolts. As described previously, the force-representing signal will fall below, and remain below, the fedback storage signal $e_s$ only upon the occurrence of a peak in the force-representing singal, and accordingly when such a peak occurs the output of the peak-decision comparator 114 goes HIGH and only then turns on the two grounded-emitter NPN transistor electronic switches 180 and 182 which iti controls; prior to the occurrence of the peak, when the output of the peak-decision comparator 14 is low, each of these electronic switches is biased off.

The collector of transistor switch 180 is connected through the mode switch 48 to the HOlD line 190 which determines the HOLD control voltage at HOLD terminal 108 of the force digital voltmeter 46. When the output of peak-decision comparator 14 is low, indicating that the analog force-representing signal has not passed its peak, the transistor switch 180 is off, the HOLD line 190 is high, and the HIGH control voltage at HOLD control terminal 108 permits the force digital voltmeter 46 to follow both increases and decreases in the force-representing signal. When the peak-decision comparator output goes high, indicating a peak has been reached, the control voltage on HOLD line 190 will go low, freezing the reading on the force digital voltmeter 46 substantially at the peak value, as desired. Similarly, the displacement digital voltmeter will follow both increases and decreases in displacement signal until the peak-decision comparator output goes high, indicating that a peak in force signal has occurred, at which time the connection of the collector of transistor switch 182 through mode switch 72 causes the HOLD line 200 for the displacement digital voltmeter to go low, freezing the reading then occurring on the displacement digital voltmeter as desired.

It is noted that mode switch 48 in the position shown not only operates the force digital voltmeter in its peak reading mode, but also isolates the discharge resistor 210 from ground, so that capacitor 26 retains its charge for quite long periods of time. However, when normal operation of the voltmeter is desired so as to follow both increases and decreases in force-representing signal, throwing of the mode switch 48 to its opposite condition not only opens the HOLD line to prevent the peak-holding action, but also connects the lower terminal of resistor 210 to ground, thereby to accomplish a discharging and resetting of capacitor 26. This mode switch is therefore also utilized as a reset switch to eliminate a peak reading and prepare the equipment for reading of a subsequent peak when this is desired.

Mode switch 72, when thrown to its NORMAL position, opens up line 200 to permit the displacement digital voltmeter to follow both increases and decreases in displacement, regardless of peaks, when such operation is desired.

The electronic elements utilized are particularly simple and inexpensive; for example, the peak-decision comparator and the charge-decision comparator constitute the two halves of a commercial Motorola Type 1414 L integrated circuit, the Darlington pair buffer circuit may be a single small commercial integrated circuit, and the remaining five transistors may all be part of a single standard integrated circuit also.

It will therefore be appreciated that there has been provided a system for producing a digital electronic representation of an electric analog signal, which is highly accurate in vieiw of the direct supply of the analog signal to the signal input of the digital voltmeter; which is capable of holding its reading for extremely long times, since the HOLD signal does not decay with capacitor discharge and the voltmeter reading can therefore remain exactly constant despite substantial discharge of the storage capacitor; which is inexpensive, only only because of its general circuit configuration, but particularly because inexpensive components permitting appreciable leakage of the charge on the capacitor can be used without affecting the accuracy of operation; and which can perform well at extremely low frequencies of occurrence of peaks, or at higher speeds with suitable modification of time-constants.

While the invention has been described with particular reference to specific embodiments thereof in the interest of complete definiteness, it will be understood that it may be embodied in a variety of forms diverse from those specifically shown and described, without departing from the spirit and scope of the invention as defined by the appended claims.

What is claimed is:

1. Apparatus for producing and maintaining a digital electrical representation of substantially a peak value of an analog signal, comprising:

A/D converter means responsive to an input analog signal to produce an electrical digital number representation of the value of said analog signal, said A/D converter means having a control terminal which when supplied with a first value of a control signal permits said digital number representation to follow both increases and decreases in said analog signal value, and which when supplied with a second value of said control signal prevents said electrical digital representation from following reductions in said analog signal value from said peak value;

electrical peak-detector and storage means supplied with said analog signal for producing and storing a signal substantially equal to said peak value of said analog signal;

comparator means for comparing said stored signal with said analog signal and for producing a control signal of said second value when the value of said stored signal exceeds the value of said analog signal by at least a predetermined amount and for producing a control signal of said first value at other times; and means for applying said control signal to said control terminal of said A/D converter means to hold constant said digital number representation while said second value of said control signal persists.

2. The apparatus of claim 1, in which said A/D converter comprises means for preventing said digital number representation from changing in either sense when said control terminal is supplied with said second value of said control signal.

3. The apparatus of claim 1, in which said peak-detector and storage means comprises capacitive means and means for charging said capacitive means only so long as said analog signal is increasing in value.

4. The apparatus of claim 3, in which said peak-detector and storage means comprises differential amplifier means supplied at one input terminal thereof with said analog signal and supplied at another input terminal thereof with a signal level varying in accordance with the voltage across said capacitive means, and means for charging said capacitive means only when said signal level at said one input terminal exceeds the level of said input signal at said one terminal.

5. The apparatus of claim 4, wherein the gain of the signal loop extending from said one input terminal through said differential amplifying means and through said electrical storage means to said other input terminal is greater than unity thereby to cause said signal level at said other input terminal to be alternately greater and less than said analog signal level at said one input terminal when said analog signal is increasing, whereby said capacitive means is charged by current pulses occurring during time-spaced intervals so long as said analog signal is increasing in value.

6. The apparatus of claim 5, wherein said peak-detector and storage means comprises a source of charging current and electronic switch means connected thereto to provide a substantially constant-current source for charging said capacitive means during said intervals when said electronic switch means is rendered conductive, and means responsive to the output of said differential amplifier means to render said switch means conductive each time the level of said analog signal exceeds the level of said signal at said other terminal.

7. The apparatus of claim 1, in which said comparator means comprises means for changing said control signal from said first to said second value thereof only when said analog signal is less than said stored signal level by a substantial amount.

* * * * *